Patented Dec. 9, 1947

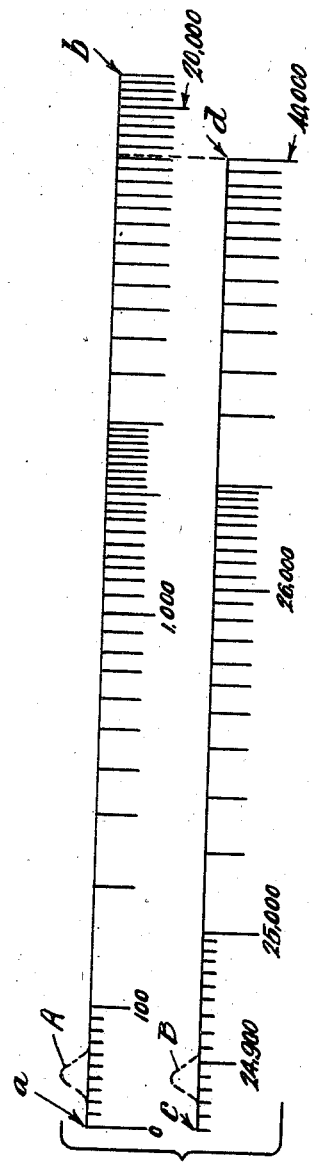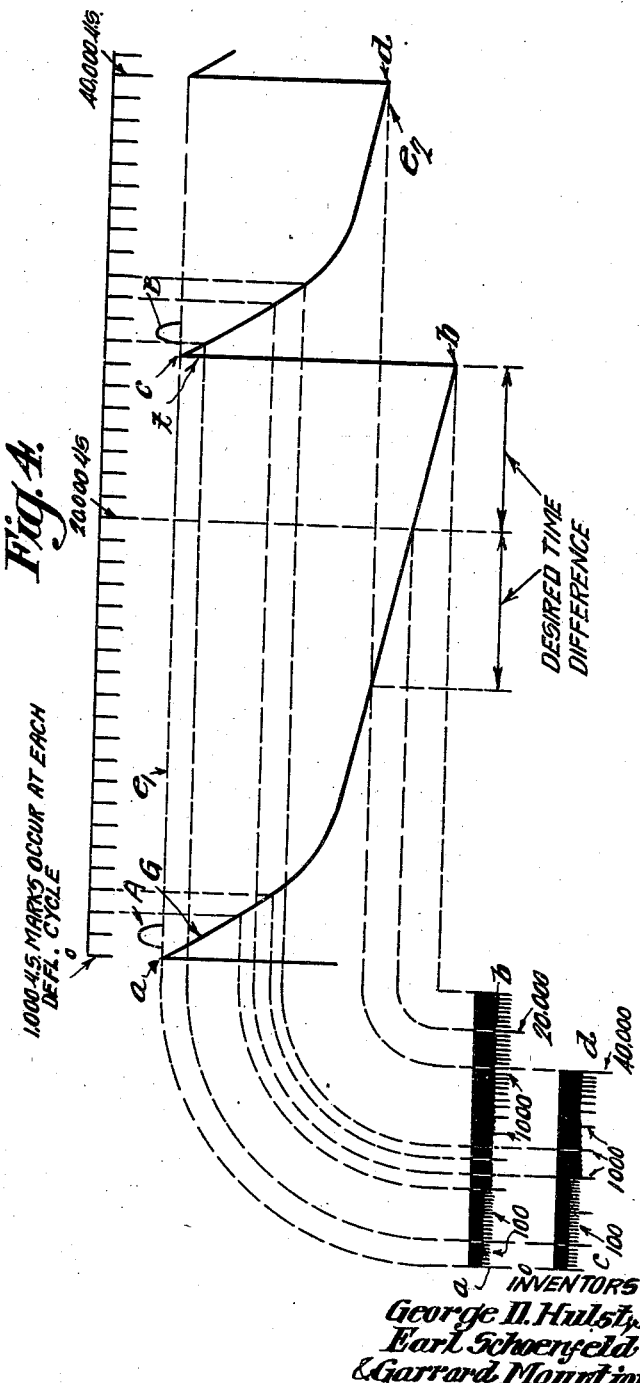

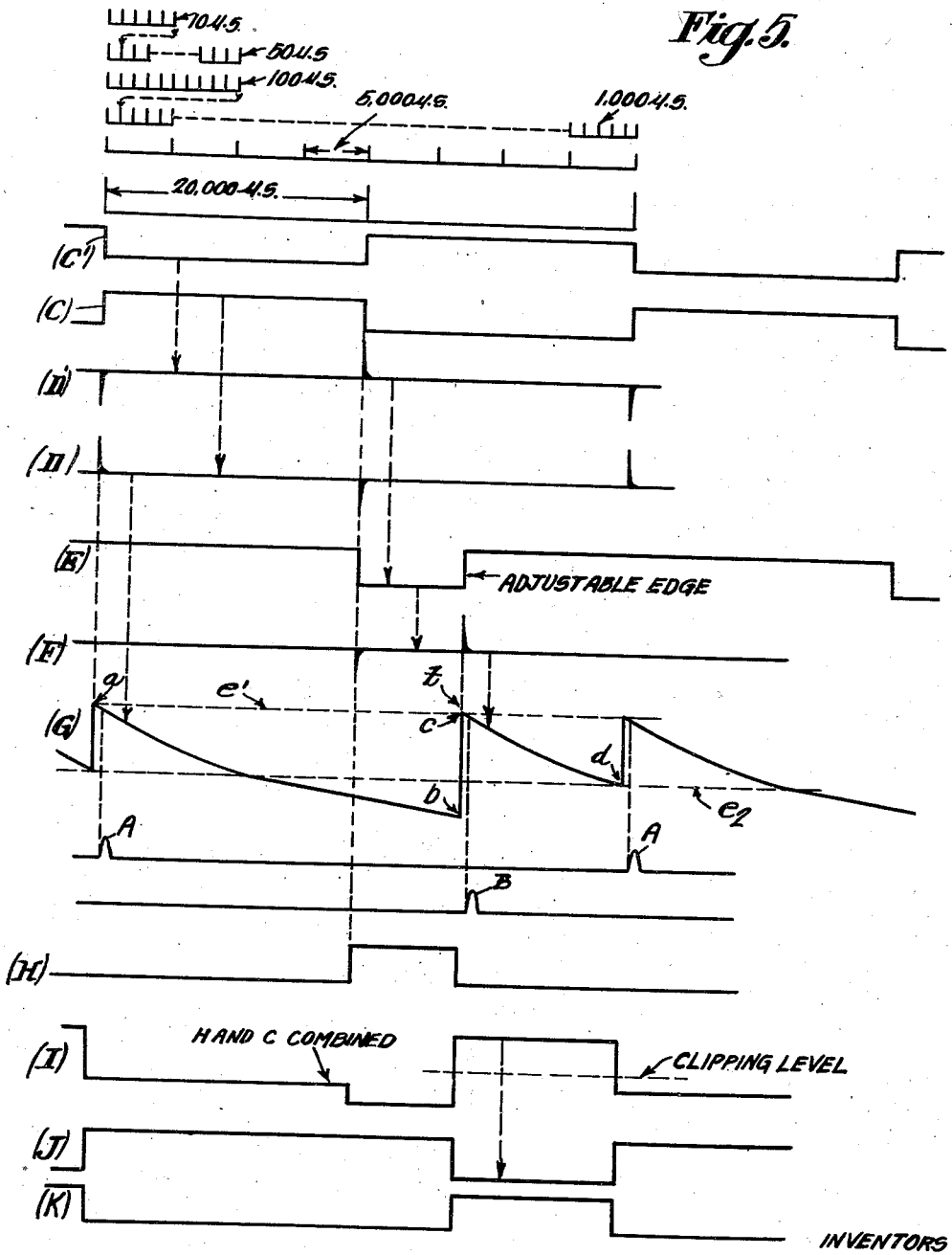

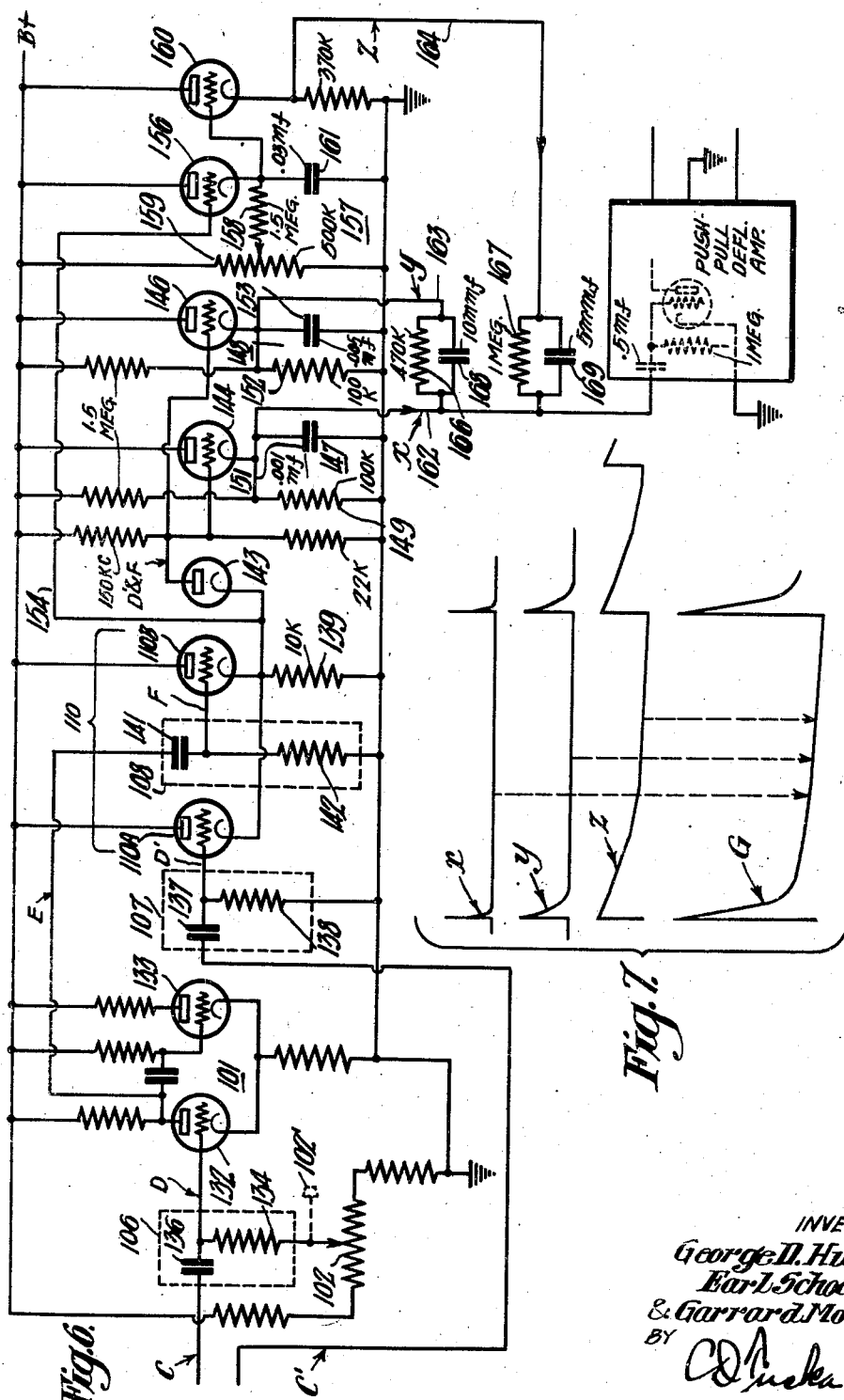

2,432,158

UNITED STATES PATENT OFFICE 2,432,158

RADIO NAVIGATION SYSTEM

George D. Hulst, Jr., Upper Montclair, N. J., and Earl Schoenfeld, Mamaroneck, and Garrard Mountjoy, Manhasset, N. Y., assignors to Radio Corporation of America, a corporation of Delaware Application December 14, 1944, Serial No. 568,084

6 Claims. (Cl. 250—11)

1

Our invention relates to radio navigation systems and particularly to systems of the type utilizing the time difference in the propagation of radio pulses from synchronized ground stations.

Navigation systems of this type employ pairs of synchronized ground stations that transmit radio pulses having at the instant of radiation a fixed time relation to each other. Each pair of ground stations preferably transmits pulses at its individual assigned repetition rate for the purpose of station selection. The pulses are radiated to receiving equipment located on the aircraft or ship whose position is to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having "time difference" lines printed thereon for the several pairs of ground stations are provided for use with the navigation system.

In order to measure the time difference in the arrival of successive pulses from a pair of ground stations, timing marker pulses that have a known time interval between them are generated. Also, pulses having a definite time relation to the time marker pulses are generated for the purpose of driving or synchronizing cathode ray deflecting circuits. These deflecting circuits produce cathode ray sweep traces on which the marker pulses and/or the received ground station pulses appear.

For the purpose of selecting a particular pair of ground stations, the operator selects a particular pulse repetition rate for the driving or synchronizing pulses corresponding to the repetition period of the pulses transmitted from said pair whereby the deflecting circuits may be synchronized with the received pulses from the selected pair of ground stations. Thus a particular pair of ground stations is selected at the receiver apparatus by turning a station selection switch to the position indicated on the receiver panel for obtaining sweep synchronizing pulses having the same repetition period as that of the pulses being transmitted from the selected pair of ground stations. Now the received pulses

2 from the selected pair of ground stations can be made to appear stationary on the cathode ray sweep or trace whereas those received from the other pairs of ground stations will move rapidly along the same trace.

In operation, the pulses from the two transmitter stations of a selected pair of stations (which pulses will be referred to as A and B pulses, respectively) are made to appear on two cathode ray traces and are brought into alignment or coincidence by moving one of them along its cathode ray sweep trace, this being done by adjusting the start of the cathode ray sweep. It is then possible to measure the time displacement of the sweep required for pulse alignment. This is done by counting certain timing markers appearing on the cathode ray traces and thus the desired time difference between pulses is determined. The present application describes an improved method of and system for thus determining the desired time difference.

An object of the present invention is to provide an improved method of and means for determining the time difference between electrical pulses.

A further object of the invention is to provide improved receiving equipment for a radio navigation system of the type utilizing the propagation of radio pulses from pairs of synchronized ground stations.

A still further object of the invention is to provide an improved method of and means for indicating the time difference between radio pulses transmitted from synchronized ground stations.

The invention will be better understood from the following description taken in connection with the accompanying drawing in which Figure 1 is a block diagram of navigation receiving apparatus designed in accordance with one embodiment of the invention, Figure 1a is a block diagram representing one pair of ground radio transmitter stations of the navigation system which transmit A and B pulses, respectively.

Figure 2 is a block and circuit diagram of the pulse generating unit shown in Fig. 1, Figure 3 is a view of the screen end of the cathode ray indicator tube included in the apparatus of Fig. 1 showing the cathode ray sweep traces with the received pulses A and B in alignment and with the timing marker pulses indicating the time interval between the received A and B pulses.

Figure 4 is a view showing the relation of the cathode-ray traces to the horizontal deflecting waves, Figure 5 is a group of graphs which are referred to in explaining the operation of the system shown in Fig. 1, Figure 6 is a circuit diagram of the wave shaping and cathode-ray deflection and control circuits included in the system of Fig. 1, and Figure 7 is a group of graphs that are referred to in explaining the operation of the circuit shown in Fig. 6.

In the several figures, similar parts are indicated by similar reference characters.

*The pulse generator unit*

In Fig. 1, the pulse generating circuit for producing the timing marker pulses and for producing the controlling or synchronizing pulses that control the cathode-ray deflection is shown in block diagram at the top of the figure. It is shown in detail in Fig. 2. Referring to Figs. 1 and 2, the pulse generator comprises a crystal oscillator 10 that produces a sine wave voltage of stable frequency which in the example illustrated is 100 kilocycles per second; the repetition period being 10 micro-seconds. The frequency of the crystal oscillator output may be increased or decreased slightly by a manual adjustment as indicated at the control knob 11 for obtaining a right or left drift of a received pulse on a cathode-ray sweep trace.

The crystal oscillator 10 drives a blocking oscillator 12 or the like to produce periodic pulses which, in the present example, also recur at the rate of 100 k. c. per second. The repetition period or time interval between successive pulses is, therefore, 10 micro-seconds.

The frequency of the 10 $\mu$. s. pulses is divided by five by means of a suitable frequency divider 13 such as a second blocking oscillator to produce 50 $\mu$. s. pulses. While specific values are being given for the several frequency division steps, the invention is not limited to these particular values.

The 50 $\mu$. s. pulses are applied through a lead 14 to a frequency divider 16 of the counter type described in White Patent 2,113,011. It divides the frequency by two to produce 100 $\mu$. s. pulses. Also, an additional circuit is provided so that the divider 16 may be made to lose a "count" for the purpose of obtaining a different selected pulse repetition period.

The divider 16 comprises a counter circuit portion including an input or "bucket" capacitor 17, a pair of diodes 18 and 19, a "storage" capacitor 21 and a blocking oscillator portion 22. In addition, it includes a pair of diodes 23 and 24 associated with the storage capacitor 21 for the purpose of making the divider 16 lose a count upon the application of a pulse from a conductor 26 as will be explained hereinafter. The blocking oscillator 22 comprises a vacuum tube 27, a transformer 28 coupling the plate circuit to the grid circuit and a cathode biasing resistor 29 which is bypassed by a capacitor 31. A transformer 32 supplies the 100 $\mu$. s. pulses from the divider 16 to a frequency divider 33 which also is of the type which may be made to lose a "count."

The frequency divider 16 operates as follows: Each of the 50 $\mu$. s. pulses of positive polarity from the lead 14 puts a predetermined charge on the comparatively large capacity storage capacitor 21 as a result of a pulse of current through the comparatively small "bucket" capacitor 17 and through the diode 19; the capacity of the capacitor 17 being small enough so that capacitor 17 receives full charge before the termination of an applied pulse. At the end of this current pulse, the capacitor 17 is discharged to ground potential through the diode 18. The next 50 $\mu$. s. pulse puts an additional current pulse into capacitor 21, this raising the voltage across capacitor 21 sufficiently to trigger the blocking oscillator 22 whereby a pulse is produced across the transformer 28 as is well understood in the art. The pulse thus produced is applied to the divider 33 with positive polarity. At the same time the blocking oscillator 22 discharges the capacitor 21 to bring it back to ground potential.

The frequency divider 33 divides the frequency by five to produce 500 $\mu$. s. pulses. It includes a counter portion comprising a "bucket" capacitor 36, a pair of diodes 37 and 38, and a storage capacitor 39. It also includes a blocking oscillator portion 41 comprising a vacuum tube 42, a feedback transformer 43, a biasing resistor 44 and a bypass capacitor 46.

As in the preceding divider 16, there is provided in the divider 33 a pair of diodes 47 and 48 for subtracting counts. In the divider 33, however, the application of a pulse from a conductor 49 will subtract one, two or three counts depending upon the position of the station selection switch.

The 500 $\mu$. s. pulses are supplied over a conductor 51 to a frequency divider 52 that divides by two to produce 1000 $\mu$. s. pulses. The divider 52 is similar to the divider 16 with the count subtracting diodes omitted.

The 1000 $\mu$. s. pulses are supplied to a frequency divider 56 that divides by five to produce 5000 $\mu$. s. pulses which, in turn, are supplied to a frequency divider 59 that divides by four to produce 20,000 $\mu$. s. pulses. The dividers 56 and 59 are similar to the divider 52 except for the difference in circuit constants.

The 20,000 $\mu$. s. pulses may be passed through a clipping circuit 60 and supplies over a conductor 61 to a square wave generator 65 (Fig. 1) such as an Eccles-Jordan oscillator for obtaining a square wave having a repetition period of 40,000 $\mu$. s. From this square wave are obtained, by means of suitable wave shaping and delay circuits described hereinafter, the desired driving or synchronizing pulses for the horizontal deflection.

The 20,000 $\mu$. s. pulses are also supplied over a conductor 62 and through a "bucket" capacitor 63 of the first count subtraction circuit to a station selection switch 64; they are also supplied to the second count subtraction circuit through a coupling or blocking capacitor 66 of large capacity to a second station selection switch 67 which is ganged with the switch 64 as indicated by the broken line 68, the two switches being operated by a knob 65'.

At the switch 64, alternate switch contact points are connected to the feedback conductor 26 whereby at these switch point positions the 20,000 $\mu$. s. pulses are fed back to the divider 16 to subtract counts. It may be desirable because of distributed or stray leakage in the switch 64 or capacitors 63 to connect its switch arm to ground through a 1 megohm resistor 55 to permit charges to leak off.

At the switch 67, the last six switch contact points are connected in pairs, the three pairs of contact points No. 2—No. 3, No. 4—No. 5, and No. 6—No. 7 being connected through "bucket" capacitors 71, 72 and 73, respectively, to the feedback conductor 49 which leads to the second count subtraction circuit. Thus, with switch 67 in any one of the last six positions, 20,000 $\mu$. s. pulses are applied to the divider 33 to subtract counts.

Before discussing in detail the operation of the count subtracting circuits for station selection, it may be noted that the desired timing marker pulses are obtained at various points along the frequency divider circuit. In the present system, the 10 μ. s. pulses are supplied from the blocking oscillator 12 to an output lead 81. The 100 μ. s. pulses are supplied over a conductor 84 to an output lead 87. The 1000 μ. s. pulses and 20,000 μ. s. pulses are supplied to output leads 88 and 89. The marker leads 81, 87, 88 and 89 supply the 10 μ. s. pulses, the 100 μ. s. pulses, the 1000 μ. s. pulses and the 20,000 μ. s. pulses to a mixer tube or circuit 129 (Fig. 1) and from the mixer 129 to a vertical deflecting plate of a cathode ray tube 116 as described hereinafter. The cathode ray of the tube 116 is deflected horizontally by a deflecting wave that is in synchronism with the 40,000 μ. s. square wave from the Eccles-Jordan oscillator 65 (Fig. 1). It is evident that the 40,000 μ. s. horizontal deflection cycle has a fixed time relation to the timing marker pulses.

*Count subtraction for station selection*

Referring now more particularly to the feature of subtracting counts for the purpose of station selection, specific pulse repetition rates for a plurality of pairs of ground transmitter stations will be referred to by way of example to aid in explaining the operation.

It will be assumed that the first pair of ground stations transmit the A pulses with a repetition period of 40,000 μ. s. and transmit the B pulses with a like repetition period; that the second pair of ground stations transmit A and B pulses having a repetition period of 39,900 μ. s.; that the third pair transmits 39,800 μ. s. pulses; that the fourth pair transmits 39,700 μ. s. pulses, etc. It is apparent that for station selection at the receiving apparatus, the operator must be able to select corresponding repetition periods for the output of the square wave generator 65 which controls the cathode ray deflection cycle; namely, periods of 40,000 μ. s.; 39,900 μ. s.; 39,800 μ. s.; 39,700 μ. s.; 39,600 μ. s.; etc.

It will be noted that the several repetition periods differ from each other by 100 μ. s. or by integral multiples thereof, and that this corresponds to repetition period differences of 50 μ. s. or integral multiples thereof at the output of the frequency divider chain, i. e., at the input of the clipper 60. Therefore, the desired repetition period can be obtained by shortening the 20,000 μ. s. period by 50 μ. s., by 100 μ. s., by 150 μ. s., etc.

For example, to obtain the 39,900 μ. s. repetition period the switches 64 and 67 are moved to the No. 1 switch contact points. At this switch position the 20,000 μ. s. pulses from the lead 62 are fed back by way of the "bucket" capacitor 63, the switch 64 and the conductor 26 to the frequency divider 16 only. Upon the occurrence of a 20,000 μ. s. pulse, it produces a pulse of current through the "bucket" capacitor 63 and through the diode 23 to add a charge to the storage capacitor 21. At the end of the pulse, the capacitor 63 discharges through the diode 24 to its original potential. By properly selecting the capacity value of the "bucket" capacitor 63, the added charge is made equal to the charge which is added to the capacitor 21 by a single 50 μ. s. pulse. Thus, the 20,000 μ. s. pulse causes the blocking oscillator 22 to fire one pulse earlier or 50 μ. s. sooner than it normally would whereby the desired repetition period of 19,950 μ. s. at the clipper 60 or 39,900 μ. s. at the output of the E—J oscillator 65 is obtained. It may be noted that, in the example given, each time a 20,000 μ. s. pulse occurs, the divider 16 divides by one instead of by two.

To obtain the 39,800 μ. s. repetition period, the switches 64 and 67 are moved to position No. 2. Now the 20,000 μ. s. pulses are applied through the "bucket" capacitor 71 to the divider 33 and upon the occurrence of a 20,000 μ. s. pulse it applies a charge to the capacitor 39 through the diode 48. At the end of the pulse the capacitor 71 discharges through the diode 47 to its original potential. The capacitor 71 is given a capacity value such that this charge applied by the 20,000 μ. s. pulse is equal to the charge applied by a single 100 μ. s. pulse. Thus, upon the occurrence of a 20,000 μ. s. pulse the blocking oscillator 41 fires one pulse early or 100 μ. s. sooner than it normally would whereby the desired repetition period of 19,900 μ. s. is obtained at the clipper 60 and a repetition period of 39,800 μ. s. is obtained at the output of the E—J oscillator 65. It may be noted that in the example given, the divider 33 divides by four instead of by five upon the occurrence of each 20,000 μ. s. pulse.

To obtain the 39,700 μ. s. repetition period, the switches 64 and 67 are moved to the No. 3 position, this being the switch position shown in the drawing. Now the 20,000 μ. s. pulses are applied to both the divider 16 and the divider 33 through the switches 64 and 67 whereby both dividers lose a count. Specifically, the blocking oscillators 22 and 41 of dividers 16 and 33 fire 50 μ. s. and 100 μ. s. early, respectively, or a total of 150 μ. s. early. Thus, the desired repetition period of 2×19,850 μ. s. or 39,700 μ. s. is obtained at the E—J oscillator output.

To obtain the 39,600 μ. s. repetition period, the switches 64 and 67 are moved to the No. 4 position. Again the 20,000 μ. s. pulses are applied to the divider 33 only, but this time through the capacitor 72 which has a capacity value such that a 20,000 μ. s. pulse causes the divider 33 to lose two counts, i. e., to trigger 200 μ. s. early. Thus, the desired period of 2×19,800 μ. s. or 39,600 μ. s. is obtained at the E—J oscillator.

At the No. 5 switch position, the divider 16 again triggers 50 μ. s. early and the divider 33 triggers 200 μ. s. early, or a total of 250 μ. s. for the two dividers. Thus, the repetition period is 19,750 μ. s. at the input to clipper 60 or 39,500 μ. s. at the output of the E—J oscillator 65.

At the No. 6 switch position, only the divider 33 receives the 20,000 μ. s. pulses. These pulses are applied through the capacitor 73 which is adjusted to make the divider 33 lose three counts. Thus, it triggers 300 μ. s. early to give a repetition period of 2×19,700 μ. s. or 39,400 μ. s. at the E—J oscillator output.

At the No. 7 switch position, both of the dividers 16 and 33 lose counts, divider 16 triggering 50 μ. s. early and divider 33 triggering 300 μ. s. early, or a total of 350 μ. s. whereby the repetition period is 19,650 μ. s. at the clipper 60 or 39,300 μ. s. at the E—J oscillator output.

It may be preferred to employ a different group of repetition periods than the group of 40,000 μ. s., 39,900 μ. s., etc., assumed above. By making the final divider stage 59 divide by three, for example, instead of by four, the divider chain output pulses have a repetition period of 15,000 μ. s. so that a group of repetition periods of 30,000 μ. s., 29,900 μ. s., etc., may be employed. Or the divider stage 59 may be made to divide by five to obtain a group of repetition periods of 50,000 μ. s., 49,900 μ. s., etc.

In order to obtain a more rapid right "drift" of the A and B pulses in the preliminary steps of obtaining a time difference reading, it may be desirable to provide a capacitor 95 that may be connected by a switch 96 to the coupling capacitor 66 so that by closing the switch 96 additional counts will be lost by the divider 33. Thus, the A and B pulses may be drifted toward the right by closing the switch 96. When the switch 96 is opened the A and B pulses stop drifting and again are stationary.

The pulse generator and station selection circuit described in the foregoing pages is the same as that described in application Serial No. 552,146, filed August 31, 1944, in the name of Earl Schoenfeld, and entitled Timing marker and station selection apparatus.

Cathode-ray trace and timing marker presentation

Before describing that portion of the receiving apparatus of Fig. 1 to which the timing marker and control pulses from the pulse generator unit are applied, reference will be made to Fig. 3 showing the appearance of the cathode ray pattern from which the time interval between the A and B pulses from a pair of ground stations is determined. It will be noted that there are two cathode ray sweep traces, ab and cd which have their left-hand portions expanded.

The graphs G and J of Fig. 5 show the wave shapes of the horizontal and vertical deflecting waves, respectively, for obtaining the above-described cathode ray sweep. The starting time $t$ of the second saw-tooth wave of horizontal deflecting wave G may be adjusted by adjusting a multivibrator 101 by a knob 102' as will be explained hereinafter.

Referring to Figs. 3, 4 and 5, the received pulses A and B from the selected pair of stations are caused to appear on the first and second traces, respectively, at their expanded ends. This is accomplished by first making them stay stationary on the two sweeps by making a crystal oscillator frequency adjustment at the knob 11 in the event that there is a slight drift of these A and B pulses. The A and B pulses are now brought into the position of alignment or coincidence as shown in Figs. 3, 4 and 5 by the following procedure. By adjustment of the crystal oscillator frequency at the knob 11 and/or by moving the station selection switch knob 65' to obtain a different pulse repetition rate, the pulse A is drifted onto the expanded end of the trace ab. Next the pulse B is brought onto the expanded end of the adjustable trace cd and is brought into coincidence with the pulse A. In order to bring the pulse B into coincidence with the pulse A, the starting time $t$ of the second sweep of the horizontal deflecting wave G (Figs. 4 and 5) is adjusted by adjusting the multivibrator 101 at the knob 102', the circuit for accomplishing this being described hereinafter.

A comparison of the A and B pulses as shown in Fig. 5 with the horizontal deflecting wave G of the same figure will show that the condition of coincidence of the pulses A and B has been illustrated, both pulses falling on the expanded ends of successive traces and occurring at equal time intervals from the starts of the traces. It will be understood that while the pulses A and B and their corresponding traces appear alternately on the cathode ray tube screen, they appear to the eye to occur simultaneously because of persistence of vision, lag of phosphorescence of the screen or both.

Although the A and B pulses and the timing marks may be made to appear on the cathode ray traces simultaneously, it is usually preferred that the A and B pulses only appear on the sweep traces during the alignment step and that only the timing marks appear during the time reading step. The following description assumes that the latter is accomplished by means of suitable switching described hereinafter. After the pulses A and B have been aligned, the operator moves a switch 126 (Fig. 1) from its alignment position to a time reading position. The timing marker pulses now appear on the sweep traces as shown in Figs. 3 and 4 and by counting certain of these timing marks, the desired time difference between the pulses A and B can be obtained. The number of 1000 μ. s. units in this time difference may be determined, for example, by counting the number of 1000 μ. s. timing markers on the trace ab which lie between the 20,000 μ. s. marker and the right end of the trace cd. Or it may be determined by counting from the 20,000 μ. s. marker to the end b of the trace ab. In the example illustrated, the count is 4000 μ. s. plus a fractional 1000 μ. s. interval. The additional number of microseconds in the time difference to be determined can be estimated roughly by the fractional 1000 μ. s. spacing that remains between the last of these marks on the trace ab and the right end of the sweep cd (or the end of the sweep ab, as the case may be), but in practice it is determined precisely by counting 100 μ. s. timing markers, 10 μ. s. timing markers and estimating the units at the expanded left ends of the sweeps. This last feature will be described after a more complete discussion of the circuit.

From the foregoing discussion, it will be apparent that the amount that the starting time $t$ of graph G (Figs. 4 and 5) has to be shifted from some predetermined position such as the center of 20,000 μ. s. position in order to bring the pulse B into coincidence with the pulse A is a measure of the time difference between the pulses A and B or, in the example mentioned, it is a measure of the amount that a B pulse is away from the mid-point of the repetition period of the A pulses.

General description of cathode-ray trace producing circuits

The circuit for obtaining the operation described in connection with Figs. 3, 4 and 5 will first be described generally with reference to the block diagram of Fig. 1 and the graphs of Fig. 5.

Referring to Figs. 1 and 5, the Eccles-Jordan oscillator 65 is triggered by the 20,000 μ. s. pulses supplied over the conductor 61 to produce rectangular voltage waves C and C' of opposite polarity which are differentiated by differentiating circuits 106 and 107 to produce the waves D and D', respectively. The positive pulse portions of the wave D trigger the multivibrator 101 to produce the rectangular wave E. The timing of the back edge of the narrow pulse portion of the wave E is adjustable by means of the knob 102', this timing of the back edge controlling the starting time $t$ of the second sweep portion of the deflecting wave G as will soon be apparent. The multivibrator 101 may be of the well known type described in British Patent 456,840 to White and in the A. I. E. E. for June 1940, pp. 40 to 119.

The rectangular wave E from the multivibrator 101 is passed through a differentiating circuit 108 to produce the wave F which is supplied over a conductor 109 and through a mixer tube or circuit 110 to a deflecting wave producing circuit 111. The wave D' is also supplied over a conductor 112 and through the mixer 110 to the deflecting circuit 111 whereby the positive pulses of the wave D' and of the wave F initiate the first and second sweep cycles of the horizontal deflecting wave G. The deflecting wave G is applied from the circuit 111 through a push-pull amplifier 113 to the horizontal deflecting plates 114 of the cathode-ray indicator tube 116. The circuit 111 will be described in detail hereinafter with reference to Fig. 6.

From the foregoing description and from a reference to the sweep separation wave K (Fig. 5) which is applied to the lower vertical deflecting plate 117, it will be apparent how the sweep traces $ab$ and $cd$ are obtained.

Referring again to the block and circuit diagrams of Figs. 1 and 6, the vertical deflection or trace separation wave K is produced by supplying the wave C from the E—J oscillator 65 over a conductor 118 to a mixing and clipping tube 119 where the wave C and a wave H are added and reversed to produce the wave I (Fig. 5) which is then clipped and the clipped wave reversed to produce the wave J. The wave H is supplied from the multivibrator 101 over a conductor 121 and through a polarity reversing tube 122 to the mixing and clipping tube 119. The output of the tube 119 is the wave J which, when reversed in polarity by a tube 123, is the desired trace separation wave K. The wave K is supplied over a conductor 124 to the lower vertical deflecting plate 117.

To make a time measurement, the operator throws a switch 126 first to a pulse alignment position for aligning the pulses A and B received from a pair of ground transmitters, and then throws it to a time marker reading position (the switch position illustrated in Fig. 1), to count time marker pulses. In the "align" position of switch 126, a radio receiver 127 supplies the A and B pulses of a pair of ground stations over a conductor 128 to the upper vertical deflecting plate 117. The receiver 127 is tuned to the carrier wave frequency common to all the transmitter ground stations of the navigation system, station selection being by means of the different pulse repetition rates for different pairs of stations as previously described.

In the time marker "read" position of switch 126, the time marker pulses of 10 $\mu$. s., 100 $\mu$. s., 1000 $\mu$. s. and 20,000 $\mu$. s. repetition periods are supplied from the mixer tube 129 over a conductor 131 to the upper vertical deflecting plate 117, the A and B pulses no longer being applied to the cathode ray tube 116.

*Detailed description of Figure 6*

Figure 1:
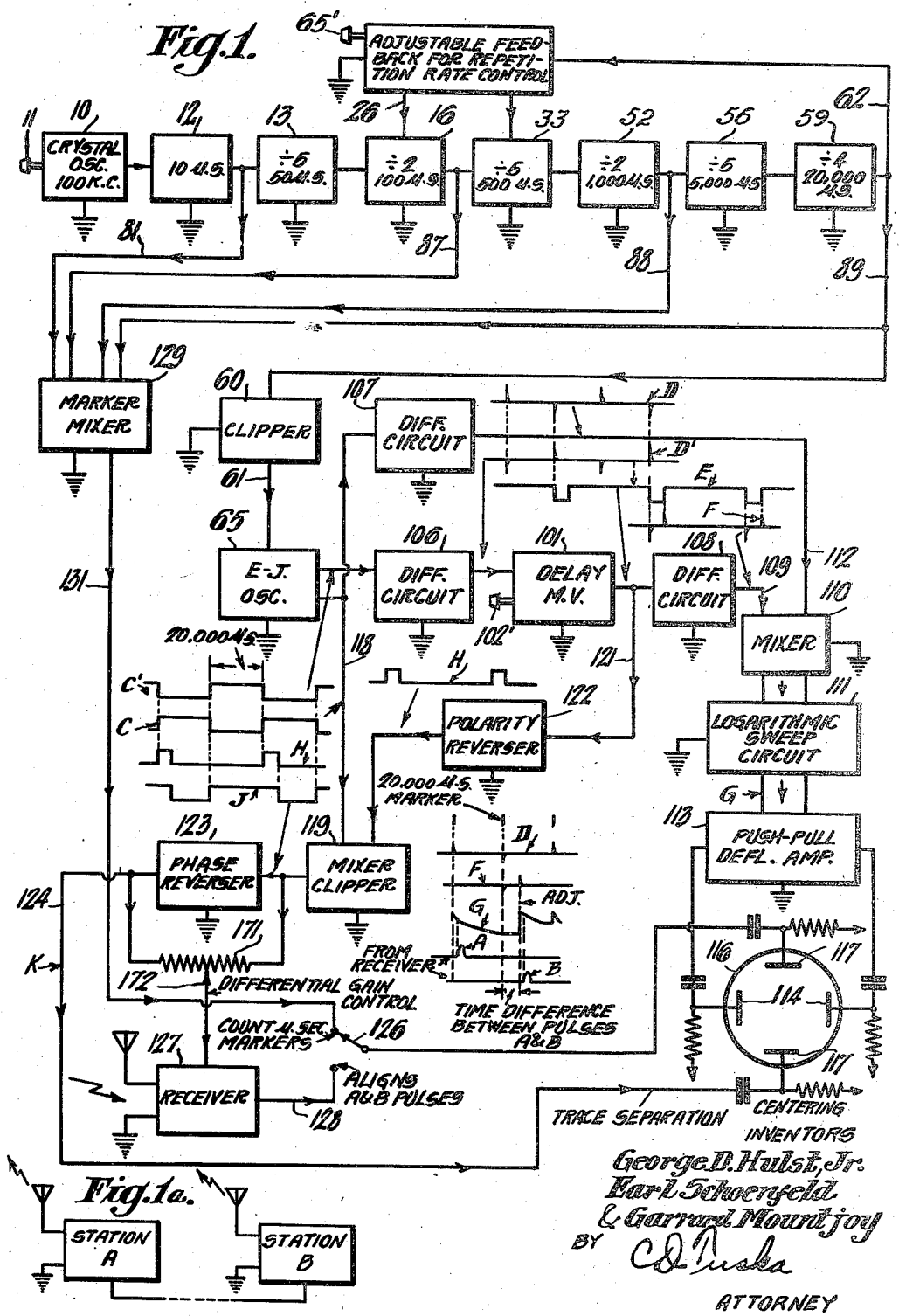
Figure 2:
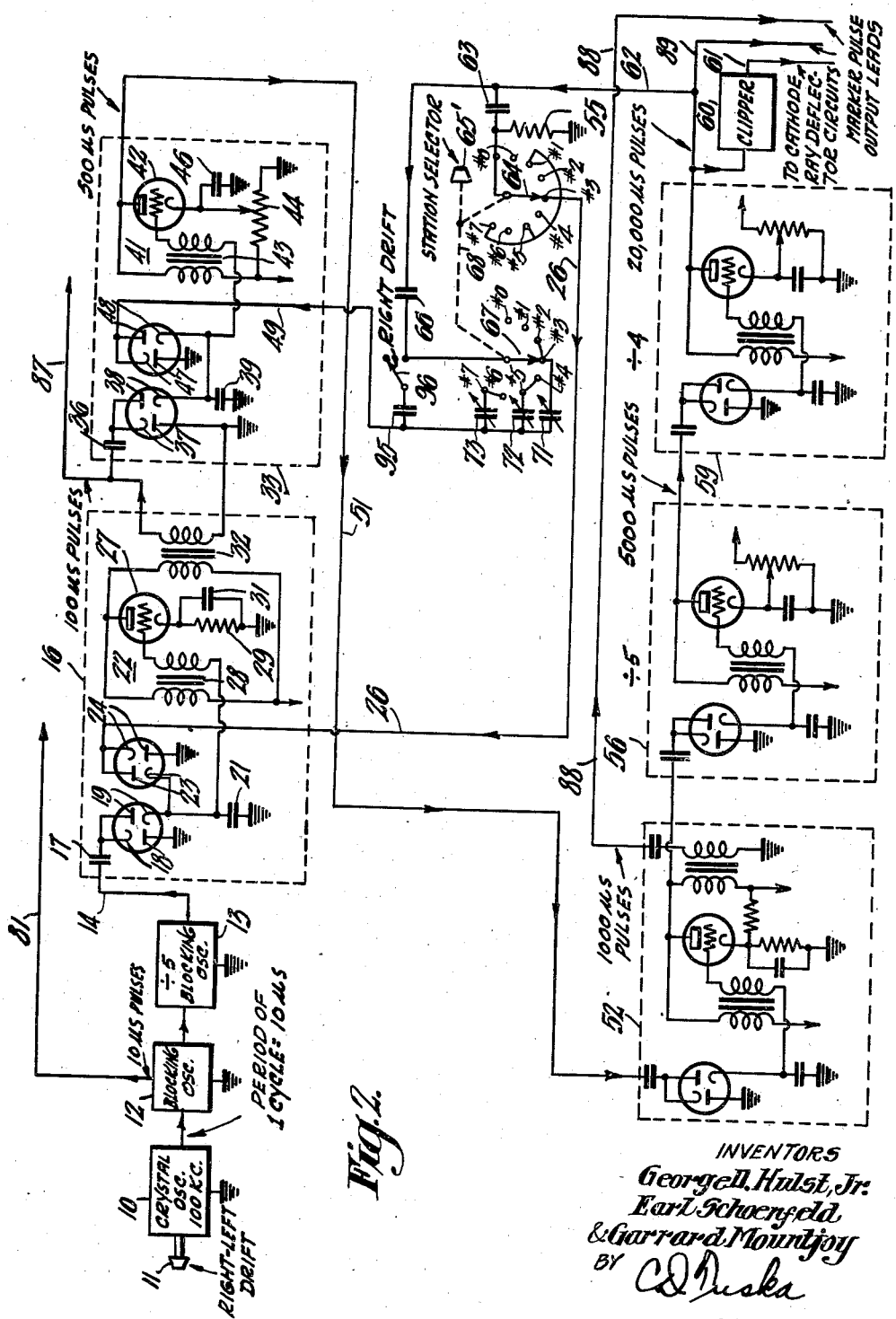

The detailed description of Fig. 6 will now be given. Referring to Fig. 6, the multivibrator 101 comprises two triodes 132 and 133 which are connected to form a cathode-coupled multivibrator. The pulses D from the differentiating circuit 106 are applied to the grid of the triode 132, this grid having an adjustable positive bias applied thereto from a potentiometer resistor 102 through a grid resistor 134. This bias is adjusted by means of the control knob 102' for adjusting the time of occurrence of the back edge of the narrow multivibrator pulse of the wave E. The differentiating circuit 106 comprises a small coupling capacitor 136 and the grid resistor 134.

The differentiating circuit 107 applies the pulses D' to the grid of a triode 110A that forms part of the mixing circuit 110. The differentiating circuit 107 comprises a small coupling capacitor 137 and a grid resistor 138. The differentiating circuit 108 applies the pulses F to the grid of a triode 110B forming the other part of the mixer 110, the tubes 110A and 110B having a common cathode resistor 139 across which the mixed signals D' and F appear. The differentiating circuit 108 comprises a small coupling capacitor 141 and a grid resistor 142.

The mixed signals D' and F preferably are applied through a clipper diode 143 to keep the amplitude of the positive pulses a constant value. The clipped pulses are applied to the grids of a pair of triodes 144 and 146.

The triodes 144 and 146 have wave shaping cathode circuits 147 and 148, respectively. The circuit 147 comprises a cathode resistor 149 and a capacitor 151 in parallel therewith. The circuit 148 comprises a cathode resistor 152 and a capacitor 153 in parallel therewith.

Upon the occurrence of either a pulse D' or a pulse F, the tubes 144 and 146, which are normally biased to cut-off, conduct anode current to charge the capacitors 151 and 153, respectively. This charging of 151 and 153 is practically instantaneous. At the termination of the pulse D' or F, the capacitors 151 and 153 discharge at a rate that is slow compared with the charging rate and at a rate that is determined by the time constants of the circuits 147 and 148, these time constants differing from each other. Thus, as illustrated in Fig. 7, across the circuits 147 and 148 there are produced the voltage waves $x$ and $y$, respectively, which are to be combined with a third voltage wave $z$ to produce the desired logarithmic deflecting wave G.

The wave $z$ is obtained by applying the pulses D' and F from the cathode resistor 139 over a conductor 154 to the grid of a tube 156 which includes a wave shaping network 157 in its cathode circuit. The network 157 comprises a high impedance resistor 158, the lower portion of a biasing resistor 159, and a capacitor 161. As in the wave shaping circuits for producing the waves $x$ and $y$, the capacitor 161 is charged rapidly upon application of a pulse to the tube 156. To produce wave $z$, however, the discharge of capacitor 161 is made slow enough by proper adjustment of the time constant of network 157 so that it (unlike capacitors 151 and 153) has not discharged completely by the time the next pulse D' or F occurs. The wave $z$ is applied to a cathode follower tube 160.

It will be seen that the effect of adding the waves $x$ and $y$ to the wave $z$ is to greatly increase the slope of the deflecting wave G at its start whereby the scale for the corresponding portion of the cathode-ray trace is expanded. The waves $x$, $y$ and $z$ are added by supplying them through leads 162, 163 and 164 to the input circuit of the deflecting-wave amplifier 113. The leads 163 and 164 preferably include high impedance resistors 166 and 167 shunted by capacitors 168 and 169, respectively, for obtaining undistorted addition of the several waves. It will be apparent that the deflecting wave G may be shaped as desired for different scale expansions by changing the time constants of one or more of the circuits 147, 148 and 157.

In Fig. 6, circuit values have been indicated in ohms, thousands of ohms, megohms, microfarads and micro-microfarads merely by way of example.

It should be understood that the invention is not limited to the use of the specific logarithmic deflecting wave circuit described above and, in fact, is not limited to the use of a deflecting wave logarithmic in wave form as an exponential shaped deflecting wave may be used.

Differential gain control circuit

A differential gain control circuit for the receiver 127 preferably is provided as indicated in Fig. 1 for the purpose of keeping the amplitudes of the A and B pulses substantially alike at the receiver output, thus facilitating the A and B pulse alignment. The gain control circuit includes a potentiometer resistor 171 to the opposite ends of which the waves J and K are applied. An adjustable tap 172 may be moved to either side of the center of resistor 171 to decrease the gain of the receiver 127 during either the reception of the pulse A or the pulse B. As this circuit forms no part of the present invention no detailed description will be given. It may be noted that the differential gain control circuit may be the same as that described in application Serial No. 560,648, filed October 27, 1944, and entitled Radio navigation system, in the name of George D. Hulst, Jr.

Measurement of fractional 1000 μ. s. interval

Under the heading cathode-ray trace and timing marker presentation it has been explained with reference to Fig. 3 how the number of 1000 μ. s. intervals in the time difference measurement may be found by counting 1000 μ. s. markers on the trace ab from the 20,000 μ. s. marker to the right end of either the trace ab or the trace cd.

Instead of estimating the remaining fractional 1000 μ. s. interval, it is found accurately by counting 100 μ. s. and 10 μ. s. markers on the expanded part of the lower trace cd as follows: The 100 μ. s. marks on the trace cd from a 1000 μ. s. mark on the trace cd to the first 1000 μ. s. mark to the right on the upper trace ab are counted. Next the number of 10 μ. s. marks on the trace cd from a 100 μ. s. mark on the trace cd to the first 100 μ. s. mark to the right on the upper trace ab are counted. The remaining interval from the last 10 μ. s. mark counted to said 100 μ. s. mark on the upper trace is estimated in 1 μ. s. intervals. In the example shown in Fig. 3, this procedure gives 833 μ. s. Since there are four 1000 μ. s. markers between the 20,000 μ. s. mark and the end d of the traced cd, the total reading is 4833 μ. s.

We claim as our invention:

1. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses at a point remote from said ground stations which comprises receiving said A and B pulses at said point, producing successively pairs of sequentially occurring deflecting waves having decreasing slope from at least near the start of the wave which are identical throughout their useful deflecting portions, deflecting a cathode ray by said waves to produce two cathode ray traces, causing said A and B pulses to appear on said two traces with the B pulse on the trace that is produced by the second of said pair of deflecting waves, adjusting the starting time of the second of said pair of deflecting waves until it is such that said A and B pulses are aligned, producing groups of timing pulses with each group having a different repetition period, and causing said timing pulses to appear as timing marks on said traces whereby said time interval between the A and B pulses may be found by counting certain of the longer interval timing marks on the less expanded end of one of the traces and by counting certain of the shorter interval timing marks on the more expanded end of one of said traces.

2. In a navigation system wherein periodically recurring radio pulses are radiated from A and B ground stations as A and B pulses, respectively, with the B pulses occurring at a predetermined time following the mid-point of the period of the A pulses, the method of measuring the time interval between the A and B pulses at a point remote from said ground stations which comprises receiving said A and B pulses at said point, producing successively pairs of sequentially occurring deflecting waves having decreasing slope from at least near the start of the wave which are identical throughout their useful deflecting portions, deflecting a cathode ray by said waves to produce two parallel adjacent cathode ray traces, causing said A and B pulses to appear on said two traces with the B pulse on the trace that is produced by the second of said pair of deflecting waves, adjusting the starting time of the second of said pair of deflecting waves until it is such that said A and B pulses are aligned, producing groups of timing pulses including groups having repetition periods of 1000 μ. s. 100 μ. s. and 10 μ. s. and causing said timing pulses to appear as timing marks on said traces whereby said time interval between the A and B pulses may be found by counting certain of the 1000 μ. s. timing marks on the less expanded end of one of the traces and by counting certain of the 100 μ. s. and 10 μ. s. timing marks on the more expanded end of one of said traces.

3. In a navigation system wherein periodically recurring radio pulses are radiated from A and B ground stations as A and B pulses, respectively, with the B pulses occurring at a predetermined time following the mid-point of the period of the A pulses, means for measuring the time interval between the A and B pulses at a point remote from said ground stations comprising means for receiving said A and B pulses at said point, means for producing successively pairs of sequentially occurring deflecting waves having decreasing slope from at least near the start of the wave which are identical throughout their useful deflecting portions, means for deflecting a cathode ray by said waves to produce two cathode ray traces, means for causing said A and B pulses to appear on said two traces with the B pulse on the trace that is produced by the second of said pair of deflecting waves, means for adjusting the starting time of the second of said pair of deflecting waves until it is such that said A and B pulses are aligned, means for producing groups of timing pulses with each group having a different repetition period, and means for causing said timing pulses to appear as timing marks on said traces whereby said time interval between the A and B pulses may be found by counting certain of the longer interval timing marks on the less expanded end of one of the traces and by counting certain of the shorter interval timing marks on the more expanded end of one of said traces.

4. The method of measuring the time relation of a group of periodically recurring received A pulses with respect to a group of periodically received B pulses where both groups of pulses have the same repetition period and where each B pulse occurs following the mid-point of the A pulse period, said method comprising the steps of producing two successive cathode-ray deflecting waves starting at the same voltage level and each of identical slope and having a total repetition period equal to that of said groups of pulses, the slope of each wave being of decreasing steepness from at least near the start of the wave to the end of the wave, producing groups of timing pulses each group having a different repetition period and having a fixed time relation to the start and finish of the cycle of said two deflecting waves, causing each of said deflecting waves to produce a cathode-ray trace the first portion of which is expanded and causing said A and B received pulses to appear on the expanded portions of the cathode-ray traces produced by the first and second of said deflecting waves, respectively, changing the start of said second deflecting wave of the deflecting wave cycle with respect to a predetermined point in said cycle until the received pulses on said traces are in alignment or coincidence, causing said groups of timing pulses to produce timing marks on said traces whereby from the resulting timing marks on the less expanded portion of a trace an operator may determine within a fraction of the longest of said repetition periods to be counted the amount that the start of said second wave is shifted in time with respect to said predetermined point in said deflecting wave cycle, and counting from a certain timing mark on the expanded portion of one of said traces to a corresponding timing mark on the expanded portion of the other trace to determine said fractional repetition period, said certain timing mark and said corresponding timing mark being produced by two of said shorter-repetition-period pulses one of which follows the other along said traces in time sequence.

5. In a navigation system, receiving apparatus for measuring the time relation of periodically recurring received pulses A transmitted from a ground station A with respect to periodically recurring received pulses B transmitted from a second ground station B where the A and B pulses are transmitted with the B pulse occurring a predetermined time following the mid-point of the A pulse period, said apparatus comprising means for producing two successive cathode-ray deflecting waves starting at the same voltage level and each of identical slope and having a total repetition period equal to that of said A and B pulses, the slope of each wave being of decreasing steepness from at least near the start of the wave to the end of the wave, means for producing groups of timing pulses each group having a different repetition period and having a fixed time relation to the start and finish of the cycle of said two deflecting waves, means for causing each of said deflecting waves to produce a cathode-ray trace the first portion of which is expanded and means for causing the A and B pulses to appear on the expanded portions of the cathode ray traces produced by the first and second of said two deflecting waves, respectively, means for changing the start of said second deflecting wave of the deflecting wave cycle with respect to a predetermined point in said cycle until the received pulses on said traces are in alignment or coincidence, means for causing said groups of timing pulses to produce timing marks on said traces whereby from the resulting longer repetition period timing marks on one of said traces an operator may determine within a certain fraction of said longer period the amount that the start of said second wave is shifted in time with respect to said predetermined point in said deflecting wave cycle, and whereby the operator may count shorter repetition period timing marks on one of said traces from a certain timing mark on the expanded portion of said one trace to a corresponding timing mark on the expanded portion of the other trace to determine said fractional repetition period, said certain timing mark and said corresponding timing mark being produced by two of the shorter-repetition-period pulses one of which follows the other along said traces in time sequence.

6. The method of measuring the time relation of a group of periodically recurring received A pulses with respect to a group of periodically received B pulses where both groups of pulses have the same repetition period and where the B pulse occurs following the mid-point of the period of the A pulses, said method comprising the steps of producing two successive cathode-ray deflecting waves starting at the same voltage level and each of identical slope and having a total repetition period equal to that of said groups of pulses, the slope of each wave being of decreasing steepness from at least near the start of the wave to the end of the wave, producing groups of timing pulses having repetition periods of 20,000 $\mu$. s., 1000 $\mu$. s., 100 $\mu$. s. and 10 $\mu$. s., respectively, each group having a fixed time relation to the start and finish of the cycle of said two deflecting waves, causing each of said deflecting waves to produce a cathode-ray trace the first portion of which is expanded and causing said received A and B pulses to appear on the cathode-ray traces produced by the first and the second of said deflecting waves, respectively, on their expanded portions, delaying the start of the second deflecting wave of said deflecting cycle with respect to the mid-point of said deflecting wave cycle until the received pulses on said traces are in alignment or coincidence, causing said groups of timing pulses to produce timing marks on said traces, counting the resulting 1000 $\mu$. s. timing marks on the less expanded portion of the longer trace from the 20,000 $\mu$. s. mark to the end of one of the traces to determine within a certain fraction of the 1000 $\mu$. s. repetition period the amount that the start of said second wave is shifted in time with respect to said mid-point of the full deflecting wave cycle, counting 100 $\mu$. s. marks from a 1000 $\mu$. s. timing mark on the expanded portion of the longer of said traces to the next preceding 1000 $\mu$. s. timing mark on the shorter trace to determine said fractional 1000 $\mu$. s. repetition period to the nearest 100 $\mu$. s. interval and counting 10 $\mu$. s. marks from a 100 $\mu$. s. timing mark on the expanded portion of said longer trace to the next preceding 100 $\mu$. s. timing mark on said shorter trace to determine the fractional 100 $\mu$. s. interval to the nearest 10 $\mu$. s. interval.

GEORGE D. HULST, JR.
EARL SCHOENFELD.
GARRARD MOUNTJOY.